United States Patent [19]

Evans et al.

[11] 4,016,554

[45] Apr. 5, 1977

[54] RASTER DISPLAY APPARATUS

[75] Inventors: Peter John Evans; Clive Williams, both of Eastleigh, England

[73] Assignee: International Business Machines Corporation, Armonk, N.Y.

[22] Filed: Jan. 8, 1976

[21] Appl. No.: 647,480

[30] Foreign Application Priority Data

July 22, 1975 United Kingdom ............ 30554/75

[52] U.S. Cl. ........................ 340/324 AD; 315/367; 315/380

[51] Int. Cl.$^2$ .................... G06K 15/20; G06F 3/14

[58] Field of Search ........ 340/324 A, 324 AD, 334, 340/324 M; 315/367, 371, 380, 386

[56] References Cited

UNITED STATES PATENTS

| | | | |
|---|---|---|---|
| 3,706,904 | 12/1972 | Mordan | 315/380 X |
| 3,737,890 | 6/1973 | Salava | 340/324 AD |
| 3,906,480 | 9/1975 | Schwartz et al. | 340/324 AD |
| 3,967,266 | 6/1976 | Roy | 340/324 AD |

*Primary Examiner*—David L. Trafton
*Attorney, Agent, or Firm*—John E. Hoel

[57] ABSTRACT

In a raster display device, such as a cathode-ray tube, in which the display is computed on-the-fly, such as in the raster vector generator type, when the computation of a line, or group of lines, exceeds a given period, the raster scan is halted until the computation is complete. The line at which the scan is halted is retraced at reduced brightness, and without modulation by video information overflow, is detected by coincidence of a computation signal and line sync.

8 Claims, 8 Drawing Figures

RASTER DISPLAY APPARATUS

FIELD OF THE INVENTION

This invention relates to raster display apparatus.

BACKGROUND OF THE INVENTION

A raster is a pattern of parallel lines comprising the display area of a display device. A raster display is effected by sequentially and selectively brightening or otherwise causing to be displayed points of the raster lines. The most well known raster display device is a cathode ray tube in which an electron beam is constrained to trace a raster by means of a high speed horizontal deflection circuit and a lower speed vertical deflection circuit. A selected display is caused by supplying a sequence of bright-up pulses to the brightness control of the beam as it traces the raster. Another prior art raster display device is a matrix of light emitting diodes arranged in rows and columns and addressed sequentially row by row and diode by diode within a row by means of a multiplexing arrangement.

The advantage of raster display devices is the simplicity of their control but this is achieved at the cost of some inflexibility in the display itself. This inflexibility is most apparent in interactive display terminals which are intended to permit a user to select and modify the display at will. Heretofore, interactive raster display devices have been restricted to the simplest of displays, those comprised of a font of alphanumeric characters which can be precoded and stored at the display terminal.

Recently it has been proposed to display and modify more complex images by using data processing apparatus to compute the form of the display line-by-line as the raster lines are being traced. One example of such apparatus is the raster vector generator disclosed in copending British patent applications 49780/74 and 20485/75 and in U.S. Pat. Nos. 3,906,480; 3,883,728; and 3,895,357; and in copending U.S. Pat. application Ser. No. 478,816 filed 6/11/74 and now abandoned, all of which are assigned to the instant assignee. In the raster vector generator and similar apparatus the computation of the display is a race against the steadily advancing raster trace. If a large number of computations have to be done for a line there is the probability that the raster scan will reach the line before the computations are complete.

One solution to the problem is to do only a certain number of computations per line and to display the result, the next image frame being reserved for the remaining computations and the resultant display. The image seen by the user is the superposition of the displays of succeeding frames. This solution complicates the control apparatus and could lead to image flicker.

OBJECT OF THE INVENTION

It is therefore one object of the invention to perform the computation of the display in a raster vector generator in an improved manner.

It is still another object of the invention to display a large number of images by raster vector generator without flicker.

SUMMARY OF THE INVENTION

These and other objects, features, and advantages of the invention are accomplished by the raster display apparatus disclosed herein.

According to the invention, we provide a raster display device including means for computing line-by-line, while a raster frame is being displayed, which points of the raster frame are to be displayed, means for detecting when the time for computation for a line or group of lines exceeds a given time, means for issuing a signal upon such detection, and means responsive to said signal to halt the raster scan at the line currently being displayed for a time sufficient to complete the computation for that line or group of lines.

DESCRIPTION OF THE FIGURES

The invention will further be explained, by way of example, with reference to the accompanying drawings.

DESCRIPTION OF THE PREFERRED EMBODIMENT

Figure 1:
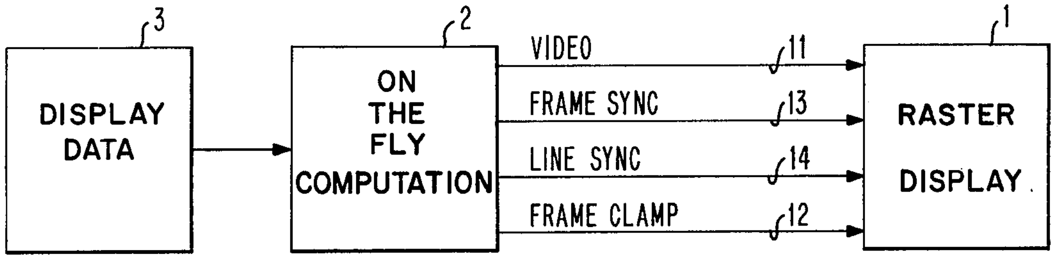
FIG. 1 is a schematic diagram of the invention.
Figure 2:
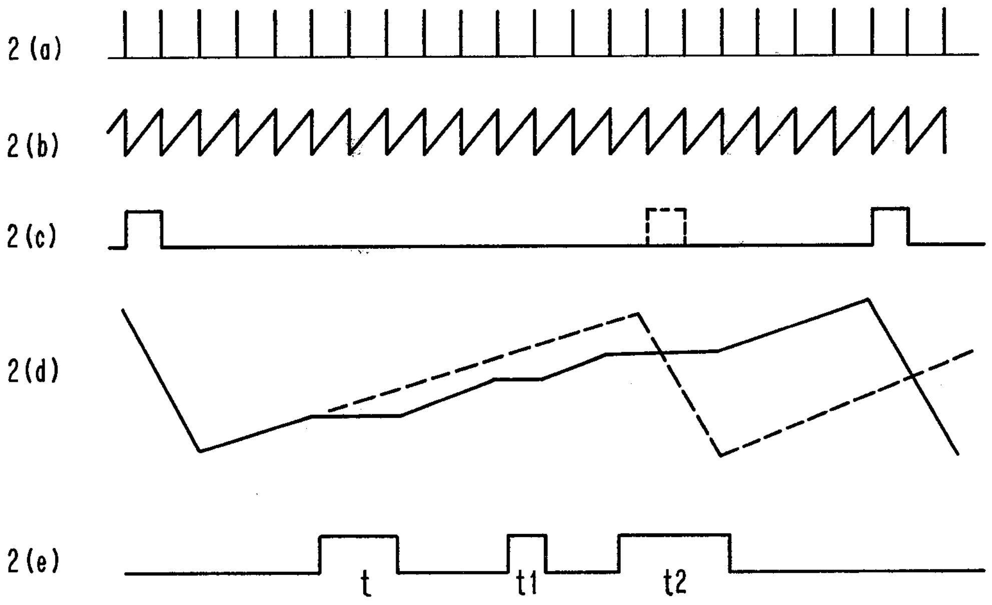
FIG. 2 shows waveforms generated in implementing one embodiment of the invention.

The invention is schematically illustrated in FIGS. 1 and 2 of the drawings. Referring to FIG. 1, the block 1 represents a raster display device of which the display is controlled by a video signal transmitted over line 11 from a computation means 2. The video signal consists of a sequence of bright-up pulses, which as their name suggests, each determine whether a respective point of the raster is illuminated or not. Computation means 2 derives the video signal from coded digital data from a display data source 3. By way of example, such coded data could represent a line image by defining each vector comprising the image by the coordinates of an end point, the slope of the vector and its length. From this data, computation means 2 determines if a vector crosses a given raster line, and if so, at which point. Computation means 2 derives the video signal for raster line $n$ of a frame while the raster display device displays line $n - m$ where $m$ is some small integral value depending on the amount of buffer storage provided for the video signal. Typically, $m$ can be 2, 3 or 4. The normally inexorable advance of the raster scan sets a limit on the amount of time that can be spent in computing the video signal and thus on the amount of detail that can be displayed. The invention overcomes this problem by halting the raster scan if computation of the video signal for a line or group of lines takes too long. In the preferred embodiment the raster scan is halted by a frame clamp signal from computation means 2 over line 12 until the computation of the video signal for the line or group of lines is complete. Only the vertical deflection of the raster scan is halted and the last traced line is repeatedly retraced until the computation is complete.

The invention is described with particular reference to a cathode ray tube as the raster display device and to the computation of vectors, but it can be applied to other transient display devices such as a matrix of light emitting diodes which are activated sequentially and repetitively by a multiplexing device, and to other computations such as adding or deleting image elements, image magnification or other image processing operations.

FIG. 2 shows some waveforms illustrating operation of the invention as embodied in a cathode ray tube. Line 2*a* shows the line sync pulses and line 2*b* the line time base. Line 2*c* shows the frame sync pulses and line 2*d* the frame time base. Line 2*e* shows examples of the frame clamp signal, the effect of which is to clamp the frame time base until removal of the frame clamp signal. The dotted-line waveform in lines 2*c* and 2*d* shows, for comparison purposes, the shape of the frame time base and the timing of the frame sync pulses in the absence of frame clamp signals. Waveform 2*e* shows that at time t computation of video data for a line has taken too long, leading to the generation of a frame clamp signal. Finishing the computation requires two line periods during which time the frame time base 2*d* is clamped and the line which has just been displayed is repeated, although without modulation by video data. To avoid unsightly effects and phosphor damage, the brightness of the trace is reduced during these repetitions. Other examples of frame clamp signals are shown at *t*1 and *t*2 of line 2*e*. It is to be noted that the frame sync signal 2*c* cannot be generated from the line time base 2*b*. The number of line periods during a frame is unpredictable. Frame sync should therefore be responsive to the number of lines for which computation has been completed. This is represented schematically in FIG. 1 by showing frame sync transmitted to raster display 1 from the computation means 2 over line 13. Line sync is also transmitted by computation means 2 over line 14.

Before describing in more detail one implementation of the above scheme, a brief description of relevant parts of a raster vector generator, such as is described in the above referenced patents and applications, will be given. Video data is supplied to the display device from a line buffer which is in two sections, A and B. While section A is supplying video data, section B is being loaded with the newly computed video data, and vice-versa. The sections can each hold an equal integral number of lines of video data, the choice of size being a matter of design. It will be supposed, to simplify the description, that each section holds one line of video data. Video vector data is loaded into the line buffer from the vector generator. Data defining each vector by its upper end point, slope and length is held in an intermediate buffer. The vector data is held in threaded lists, each list relating to vectors starting (from the top) at a given raster line. Thus those vectors starting on the top raster line are linked together in a list, each item of data containing the address of the next item of the list and the last item of the list containing an end-of-list (EOL) symbol. There are in fact two lists for each raster line: one list consists of vector data relating to vectors starting on that raster line and the other list consists of vector data relating to vectors which started on a higher raster line and continue to the line under consideration. The procedure used is to change, inter alia, the Y coordinate after the computation for a line has been completed, thereby changing the vector data to relate to the next lower raster line. The last item of the second list contains only an end-of-line (EOLN) symbol. Until EOLN is detected, it can be assumed that computation is proceeding. As soon as display data is computed, it is loaded into the available section of the buffer. The fact that data is being loaded into a buffer is an indication that computation is proceeding. A signal indicating that the buffer is being loaded is therefore a signal indicative of computation.

Figure 3:
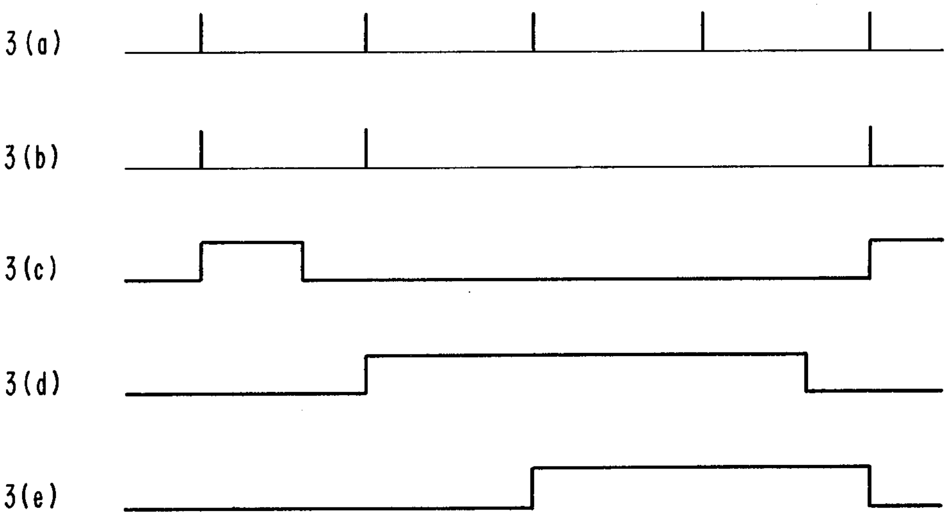
FIG. 3 is another waveform diagram.

FIG. 3 is a waveform diagram illustrating generation of the frame clamp signal in the case where the line buffer sections each have a capacity of one line of video data. Waveform 3*a* is a sequence of pulses occurring at line frequency; waveform 3*b* are pulses which are used to change from loading one section of the line buffer to loading the other section; waveform 3*c* is a signal level which is up when section A is being loaded; waveform 3*d* is a signal level which is up when section B is being loaded; and waveform 3*e* is the frame clamp signal, which is generated when a buffer section is being loaded at the end of a line period, i.e., when a line frequency pulse 3*a* is present.

Figure 4:
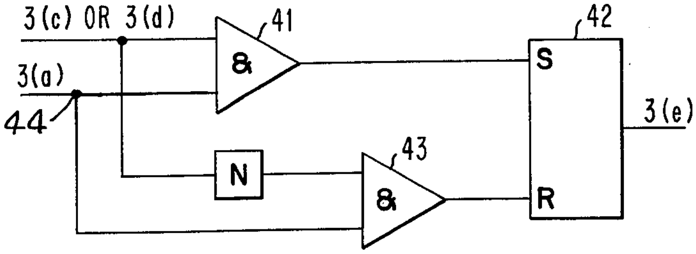
FIG. 4 is a block diagram of logic circuitry for generating a frame clamp signal.

FIG. 4 is a block diagram of logic circuitry for generating frame clamp. AND circuit 41 has, as respective inputs, waveform 3*a* and waveform 3*c* or 3*d*. If the inputs are up simultaneously, bistable circuit 42 is set and emits a frame clamp signal 3*e*. AND circuit 43 has, as respective inputs, waveform *a* and the logical inversion of waveforms *c* or *d*. If both inputs are up simultaneously, bistable circuit 42 is reset.

If the capacity of the respective sections of the line buffer is greater than one line of video data, the only change necessary to the logic circuitry of FIG. 4 is to provide a pulse divider at the lower input of AND circuit 41. If the capacity is n lines, the pulse divider divides by n. If the frame clamp is to run for multiples of n line periods, the divider is located to the left, as shown, of connection 44. This arrangement is not preferred since only a few calculations are likely to need more than one line period of frame clamp. If frame clamp is to run for an integral number of line periods, the divider is located to the right of connection 44.

Figure 5:
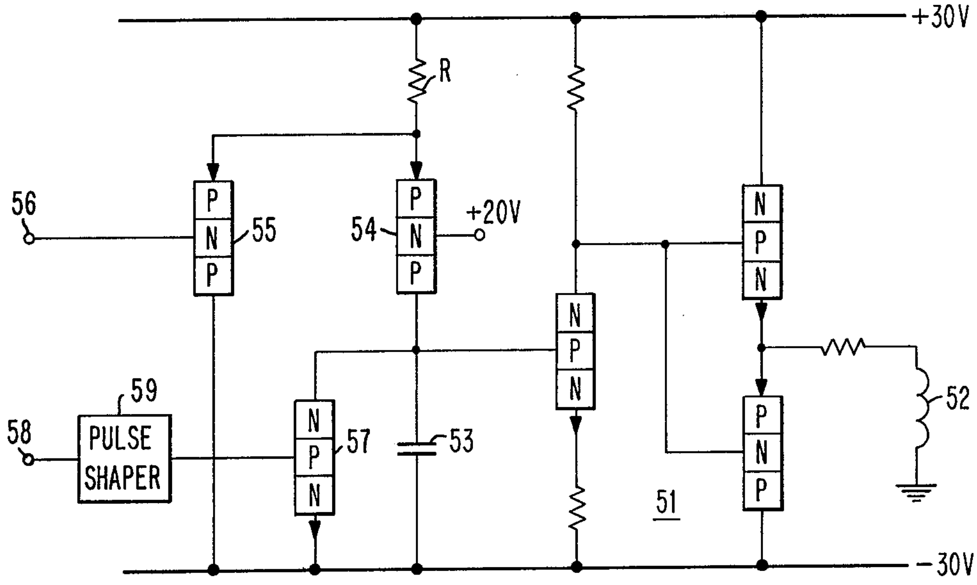
FIGS. 5, 6 and 7 are diagrams illustrating different ways of halting the vertical deflection circuitry of a cathode ray tube.

Some typical ways in which frame clamp can be caused to operate on the vertical deflection circuits of a cathode ray tube will now be described. Referring to FIG. 5, amplifier 51 controls the current supplied to Y deflection coil 52, and is, in turn, responsive to the level of charge on capacitor 53. Amplifier 51 is of known design and will not be described further. Charge is supplied to capacitor 53 by way of transistor switch 54 and which is connected in parallel with transistor switch 55, the switches 54 and 55 forming with resistor R, a long-tailed pair. Transistor 54 is normally conductive, thereby charging capacitor 53 at a constant rate, but becomes non-conductive when transistor 55 is caused to conduct. Transistor 55 is controlled by the frame clamp, which signal is applied to terminal 56. It should be noted that, for the polarity of transistor shown, the frame clamp, when on, should cause a negative voltage to appear at terminal 56. This can be achieved by means of conventional level changing circuits. Capacitor 53 discharges through transistor 57, which is rendered conductive by the frame sync signal applied to a terminal 58 connected through pulse shaper 59 to the base of transistor 57.

Figure 6:
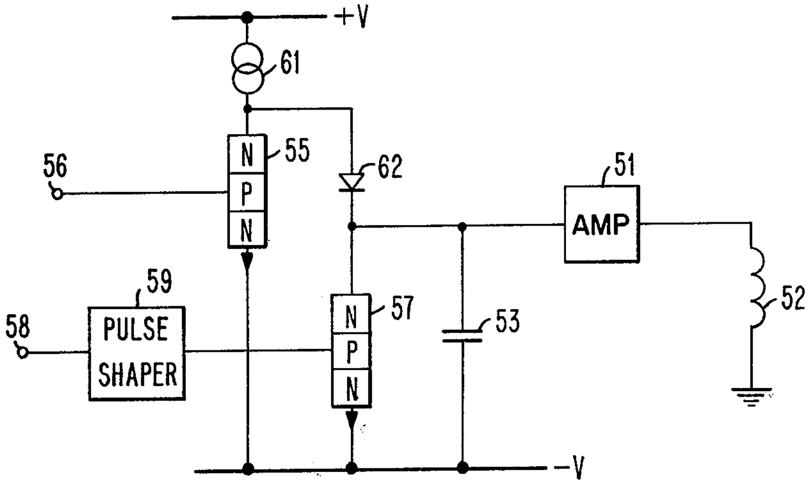

An alternative arrangement is shown in FIG. 6. Here transistor switch 55, in operation, diverts current from current source 61 which otherwise charges capacitor 53 via diode 62.

Figure 7:
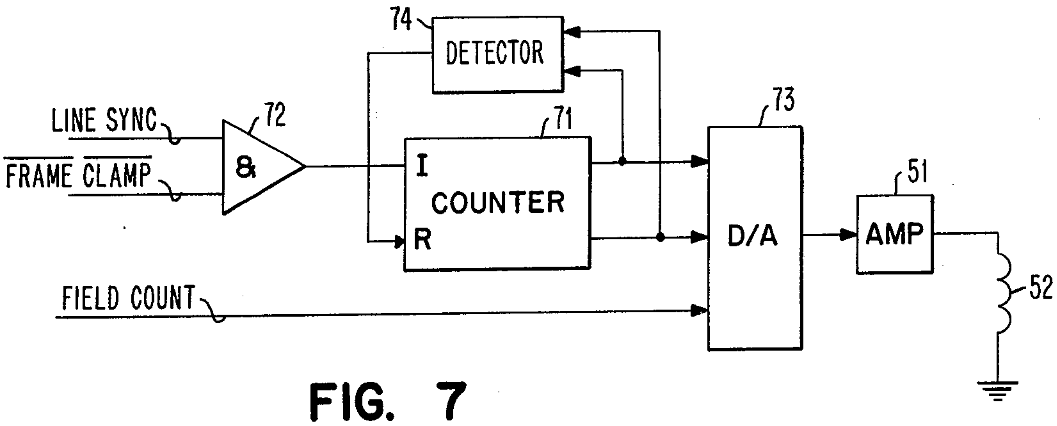

In the arrangement of FIG. 7, amplifier 51 is driven by a staircase signal rather than a ramp. Counter 71 is incremented by the output of AND circuit 72 to which the respective inputs are the signals line sync and inverted frame clamp. The output of the counter is a digital representation of the number of lines displayed. The counter does not increment when the frame clamp is present. The counter output is converted to a corresponding signal level by digital to analog converter 73. Counter 71 is reset by a signal from detector circuit 74 which is issued upon recognition that the count has reached a predetermined value, for example 500 or 1000, in accordance with the number of lines in a frame. The output of circuit 74 is in fact the frame sync signal and the arrangement of counter 71, detector 74 and AND circuit 72 can be used to generate this signal even if other means are provided to generate the deflection signal.

Counter 71 and digital to analog converter 73 can be replaced by a counter, such as a so-called cup-and-bucket counter, providing a staircase signal output.

Figure 8:
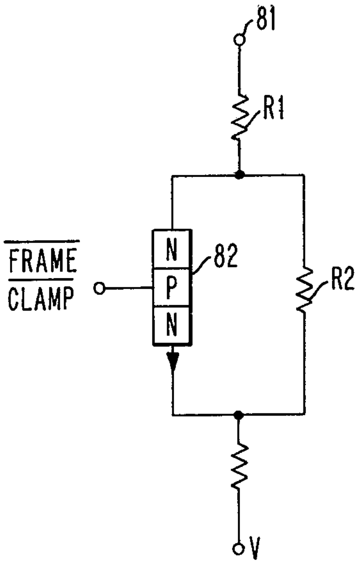
FIG. 8 is a diagram of part of a brightness control circuit.

FIG. 8 shows how the brightness 8 of the electron beam is lowered in response to a frame clamp signal. Brightness depends on the signal level at terminal 81 which could be connected in known manner to the cathode or the control grid of the cathode ray tube. Terminal 81 is connected through resistor R1 and parallel-connected transistor 82 and resistor R2, to voltage V. Transistor 82 is conductive only when frame clamp is not on. Resistor R2 is effectively in circuit only when transistor 82 is non-conductive. An alternative is to have a three level video signal which, applied to the grid in the usual way, gives rise to three levels of intensity of the beam, only one of which results in a visible display. The frame clamp is used to generate video signals selecting the lowest level of intensity.

In this specification, the description has dealt only with a simple raster system in which one image frame consists of one field. In display systems such as television, one image frame consists of two interlaced fields. It will be understood that, although the way in which a frame is constituted with influence the image computations, making it necessary to compute the image contained in a frame to determine the raster points of a field to be displayed, it will not influence operation of the invention which depends merely on detecting that the computation has been going on too long and then stopping the frame trace. Multiple fields in a frame do demand minor modifications to the described embodiments. For example, in FIG. 7, the counter should have a field count, preferably in the least significant bit, which is transmitted to the digital to analog converter and which determines the start line of the field trace.

While the invention has been particularly shown and described with reference to preferred embodiments thereof, it will be understood by those skilled in the art that the foregoing and other changes in form and details may be made therein without departing from the spirit and the scope of the invention.

We claim:

1. Raster display apparatus comprising:
a raster display device;
means for computing line-by-line which points of the raster frame are to be displayed while a raster frame is being displayed;
means for detecting when the time for computation for a line exceeds a given time;
means for issuing a signal upon such detection;
means responsive to said signal to halt the raster scan for a time sufficient to complete the computation for that line.

2. Apparatus as claimed in claim 1 wherein the raster display device is a cathode ray tube in which an electron beam is constrained to trace a raster scan on the tube screen.

3. Apparatus as claimed in claim 2 wherein brightness control means are provided which are adapted in response to said signal substantially to reduce the intensity of the electron beam.

4. Raster display apparatus comprising:
a raster display device;
means for computing line-by-line which points of the raster frame are to be displayed while a raster frame is being displayed;
means for detecting when the time for computation for a group of lines exceeds a given time;
means for issuing a signal upon such detection;
means responsive to said signal to halt the raster scan for a time sufficient to complete the computation for that group of lines.

5. Apparatus as claimed in claim 4, wherein the raster display device is a cathode ray tube of which the electron beam is constrained to trace a raster scan on the tube screen.

6. Apparatus as claimed in claim 5 wherein said signal is generated upon the coincidence of a signal indicating that computation is proceeding and a line sync pulse.

7. Apparatus as claimed in claim 6 wherein said signal is terminated by the absence of a signal indicating that computation is proceeding at the time of occurence of a line sync pulse.

8. Apparatus as claimed in claim 5 wherein brightness control means are provided which are adapted in response to said signal to substantially reduce the intensity of the electron beam.

* * * * *